United States Patent
Wang et al.

(10) Patent No.: US 8,749,641 B1
(45) Date of Patent: Jun. 10, 2014

(54) DETECTING MEDIA SOURCE QUALITY TO DETERMINE INTRODUCED PHENOMENON

(71) Applicant: Google Inc., Mountain View, CA (US)

(72) Inventors: Meng Wang, Mountain View, CA (US); Sang-Uok Kum, Sunnyvale, CA (US); Chen Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/875,192

(22) Filed: May 1, 2013

(51) Int. Cl.
H04N 17/00 (2006.01)
G01R 23/00 (2006.01)
G06F 19/00 (2011.01)

(52) U.S. Cl.
USPC .............................. 348/192; 348/180; 702/69

(58) Field of Classification Search
USPC ......... 348/180, 181, 184, 192, 700, 701, 441, 348/448; 702/69, 71, 73, 81, 122; 714/25, 714/32, 37, 47.1, 819; 382/181, 224
See application file for complete search history.

(56) References Cited

U.S. PATENT DOCUMENTS

| | | | | |
|---|---|---|---|---|
| 4,658,296 A * | 4/1987 | Beech | ........................... | 348/613 |
| 6,271,879 B1 * | 8/2001 | Overton | ......................... | 348/180 |
| 6,272,392 B1 * | 8/2001 | Capodieci | ...................... | 700/110 |
| 6,512,538 B1 * | 1/2003 | Hollier | ........................... | 348/192 |
| 6,704,451 B1 * | 3/2004 | Hekstra et al. | ................. | 382/199 |
| 7,099,518 B2 * | 8/2006 | Li et al. | .......................... | 382/255 |
| 8,345,940 B2 * | 1/2013 | Mattiuzzi et al. | .............. | 382/128 |
| 2004/0057624 A1 * | 3/2004 | Wells | ............................ | 382/233 |
| 2006/0033814 A1 * | 2/2006 | Avadanei et al. | .............. | 348/193 |
| 2011/0188836 A1 * | 8/2011 | Popkiewicz et al. | ........... | 386/278 |
| 2011/0311143 A1 * | 12/2011 | Cennini et al. | ................. | 382/191 |
| 2013/0120656 A1 * | 5/2013 | Wilson et al. | .................. | 348/563 |

* cited by examiner

*Primary Examiner* — Victor Kostak
(74) *Attorney, Agent, or Firm* — Fenwick & West LLP

(57) ABSTRACT

A system and method for detecting media source quality are provided. The system includes a data store comprising a computer readable medium storing a program of instructions for the detection of media source quality; a processor that executes the program of instructions; a video data receiver to receive video raw data, the video raw data corresponding to an uploaded and transcoded video; a video improver to apply a video improvement technique to the received video raw data to produce a modified version of the video raw data; and a video quality assessor to compare the received video raw data and the modified version of the video raw data, and based on the modified version of the video raw data improving on a factor associated with the video improvement technique, the video quality assessor indicates a phenomena affecting the quality of the uploaded and transcoded video.

18 Claims, 6 Drawing Sheets

DETECTING MEDIA SOURCE QUALITY TO DETERMINE INTRODUCED PHENOMENON

Media sharing services, such as Internet web sites and content delivering sources, serve content, such as pictures, videos, and text, to various users who access the media sharing service. The content may be sourced from a publisher, automatically generated, or from one of the various users of the media sharing source. The Internet web site may store the content, or link to various other web sites that serve the content. The content may be accessed from a variety of devices, such as a mobile application.

In cases where the content is video, the source of the video may upload the video, and subsequently, the uploaded video may be transcoded into a raw data form. Often times, the uploaded and transcoded video may contain various video attributes that may cause the video to be presented in a degraded manner.

For example, the uploaded video may contain interlacing. An interlaced video is designed to be captured, transmitted, or stored, and displayed in the same interlaced format. Because each frame of an interlaced video is composed of two fields that are captured at different moments in time, interlaced video frames will exhibit motion artifacts known as "interlacing effects", or "combing", if the recorded objects are moving fast enough to be in different positions when each individual field is captured. These artifacts may be more visible when the interlaced video is displayed at a slower speed than it was captured or when still frames are presented.

Interlaced videos introduce a phenomena called interline twitter. The interline twitter may show up when the subject being shot contains vertical detail that approaches the horizontal resolution of the video format. For instance, a person on television wearing a shirt with fine dark and light stripes may appear on a video monitor as if the stripes on the shirt are "twittering".

Interlacing effects described above may cause the digital reproduction of videos to become frustrated. For example, if a user uploads a video to a media sharing source, and the video is subsequently accessed by another user, if the combing artifacts exist in the video, the other user may not be able to clearly watch the video, or the other user's experience may be lessened due to the distraction caused by the interlaced artifacts.

In addition to the interlace issues discussed above, several other phenomena may occur or be included in the uploaded video, such as video blocking. Video blocking is caused by uploaded videos having blocked borders around an active pot on of the video. If a video is uploaded with video blocking, and then subsequently viewed, the blocking may prevent the video from being displayed at a maximum size. This may occur because significant resources on a video player may be devoted to reproducing the blocked borders.

SUMMARY

A system and method for detecting media source quality are provided. The system includes a data store with a computer readable medium storing a program of instructions for the detection of media source quality; a processor that executes the program of instructions; a video data receiver to receive video raw data, the video raw data corresponding to an uploaded and transcoded video; a video improver to apply a video improvement technique to the received video raw data to produce a modified version of the video raw data and a video quality assessor to compare the received video raw data and the modified version of the video raw data, and based on the modified version of the video raw data improving on a factor associated with the video improvement technique, the video quality assessor indicates a phenomena affecting the quality of the uploaded and transcoded video.

DESCRIPTION OF THE DRAWING

The detailed description refers to the following drawings, in which like numerals refer to like items, and in which.

DETAILED DESCRIPTION

A media sharing source that serves large amounts of content, such as videos, may not have the ability to manually determine if each of the videos is of a certain quality or does not contain certain phenomena, such as combing or blocking. Thus, certain videos uploaded to the media sharing source may include combing and blocking, and be served to users with these phenomena still included in the videos. Thus, the quality of video presentation becomes lessened, thereby potentially discouraging video viewers from returning to the media sharing source.

Disclosed herein are methods and systems for automatically detecting media quality. By employing the methods and system disclosed herein, an Internet web site or source that hosts user-uploaded media, may be configured to automatically detect if the media has various phenomena that influences the quality of the presentation of the media. Once media is detected as including phenomena, such as those described above, the media may be not permitted to be uploaded, sent to a filter to remedy the detected problem, or handled in a way in which the Internet web site or source is configured.

Thus, by employing the methods and systems disclosed herein, phenomena, such as combing and blocking, may be effectively reduced for media being served by an Internet web site or a media sharing source.

Figure 1:
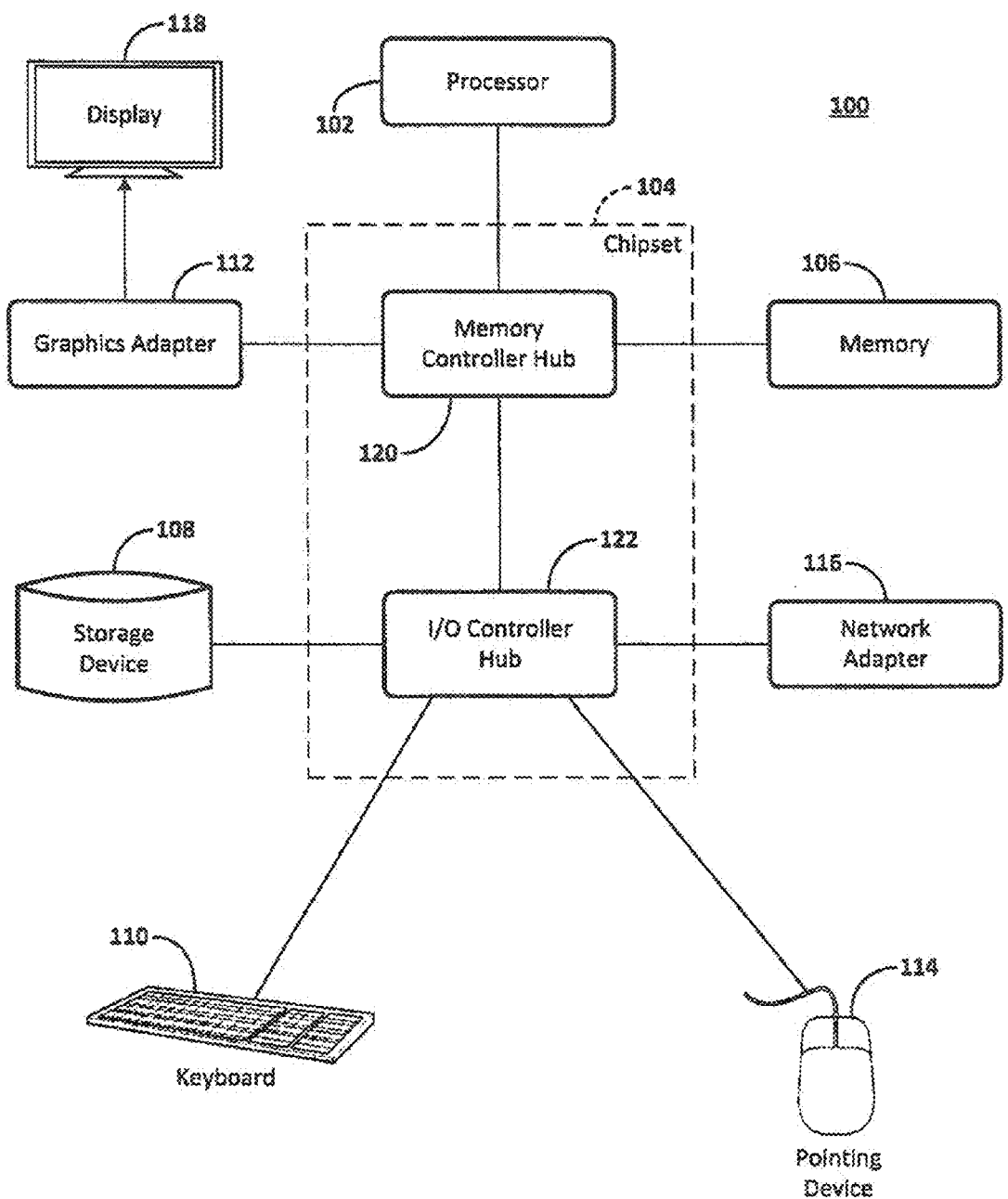
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
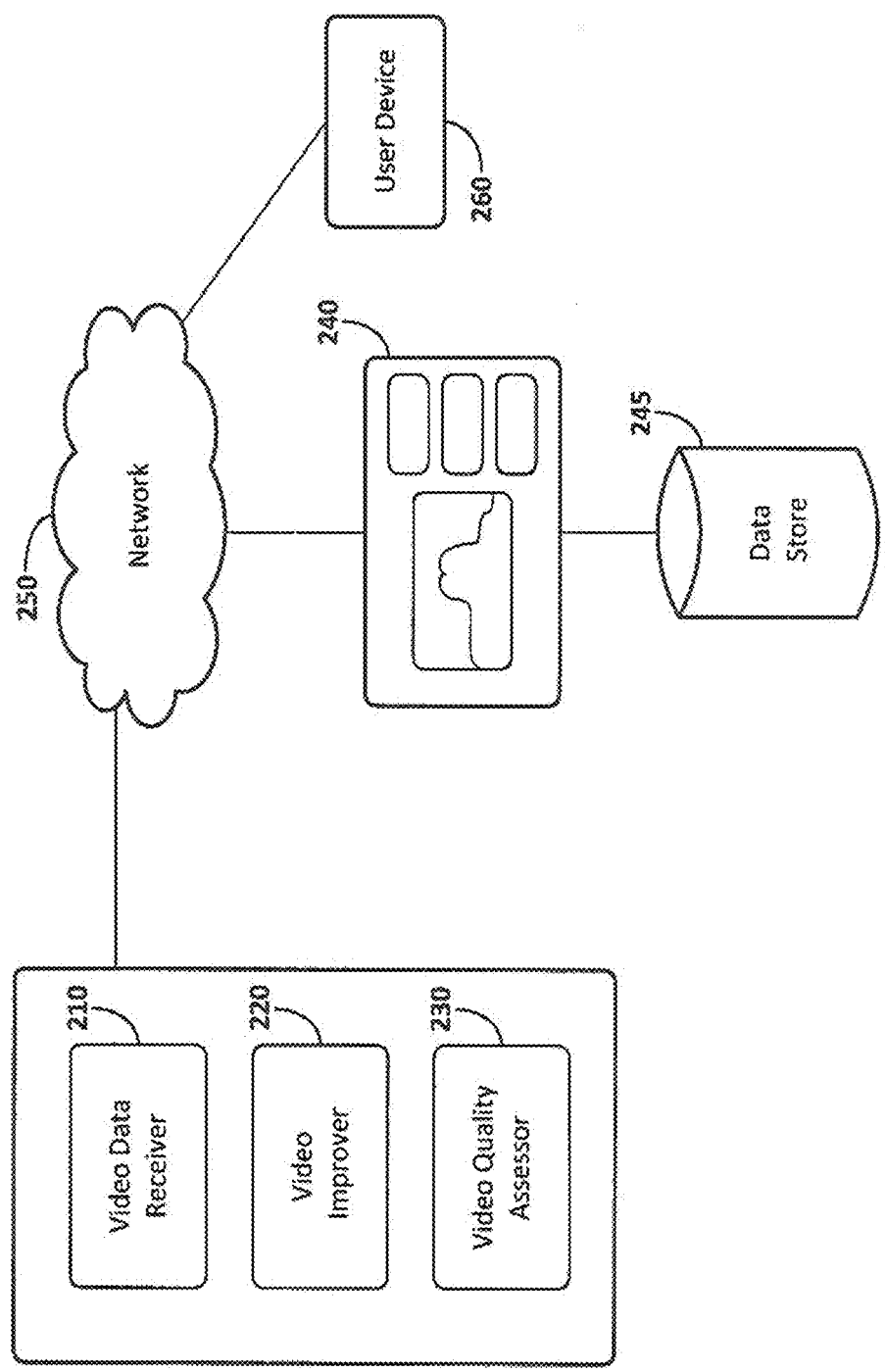
FIG. 2 illustrates an example of a system for detecting media source quality.

FIG. 2 illustrates an example of a system 200 for detecting media source quality. The system 200 includes a video data receiver 210, a video improver 220, and a video quality assessor 230. The system 200 may be implemented on a device, such as computer 100.

The system 200 may be implemented along with a video sharing web site 240. The video sharing web site 240 may be accessed by a web browser or an application installed on a smart phone, tablet, or any of the devices listed for computer 100. The video sharing web site 240 may store videos in a data store 245, or implemented via a distributed storage system, such as a cloud. Although a video sharing web site 240 is depicted, the source of media may be any service that delivers and serves media to an end user or user device.

The video sharing web site 240 may communicate over network 250 to various Internet users, such as user device 260. The user device 260 may access videos stored on the video sharing web site 240. Additionally, the user device 260 may source videos to the video sharing web site 240 via an uploading process. The device 260 may use any sort of external video data capturing device, such as a digital camera or a camera implemented along with the user device 260. Thus, the videos being sourced may come in a variety of data formats and quality.

The video data receiver 210 receives video data from the video sharing web site 240. The video sharing web site 240 may transmit a video to undergo the detection of system 200 in response to the user device 260 uploading a video, via network 250, to the video sharing web site 240. Additionally, the video sharing web site 240 may transmit a batch of videos to undergo the detection of system 200 based on an operator of the video sharing web site 240 requesting that the batch undergo the detection.

Due to the video data receiver 210 receiving data from various sources, the various videos are transcoded into a unifying format. Thus, the video data receiver 210 receives "raw data", which is data associated with the video in response to the video being transcoded into a unifying format.

The video improver 220 receives the video raw data from the video data receiver 210, and preforms various video improvement filters on the video raw data. For example, the system 200 may be configured to perform various de-interlacing filters on the video raw data.

The video quality assessor 230 may retrieve the modified video from the video improver 220. Additionally, the video quality assessor 230 may also retrieve the video raw data from the video data receiver 210. The video quality assessor 230, at this juncture, may perform a determination of whether the modified video from the video improver 220 is of an improved quality from the corresponding video raw data from the video data receiver 210. If the video quality assessor 230 determines that the quality has improved, the video quality assessor 230 denotes that the video raw data contains certain phenomena (such as interlacing or blocking) that may frustrate a potential viewer's enjoyment of the video.

Alternatively, the video quality assessor 230 may determine that there is no improvement in the modified video (or the improvement is below a predetermined threshold amount). In this instance, the video quality assessor 230 may indicate that the video raw data transmitted to system 200 does not contain any of the phenomena detected by system 200.

Figure 3:
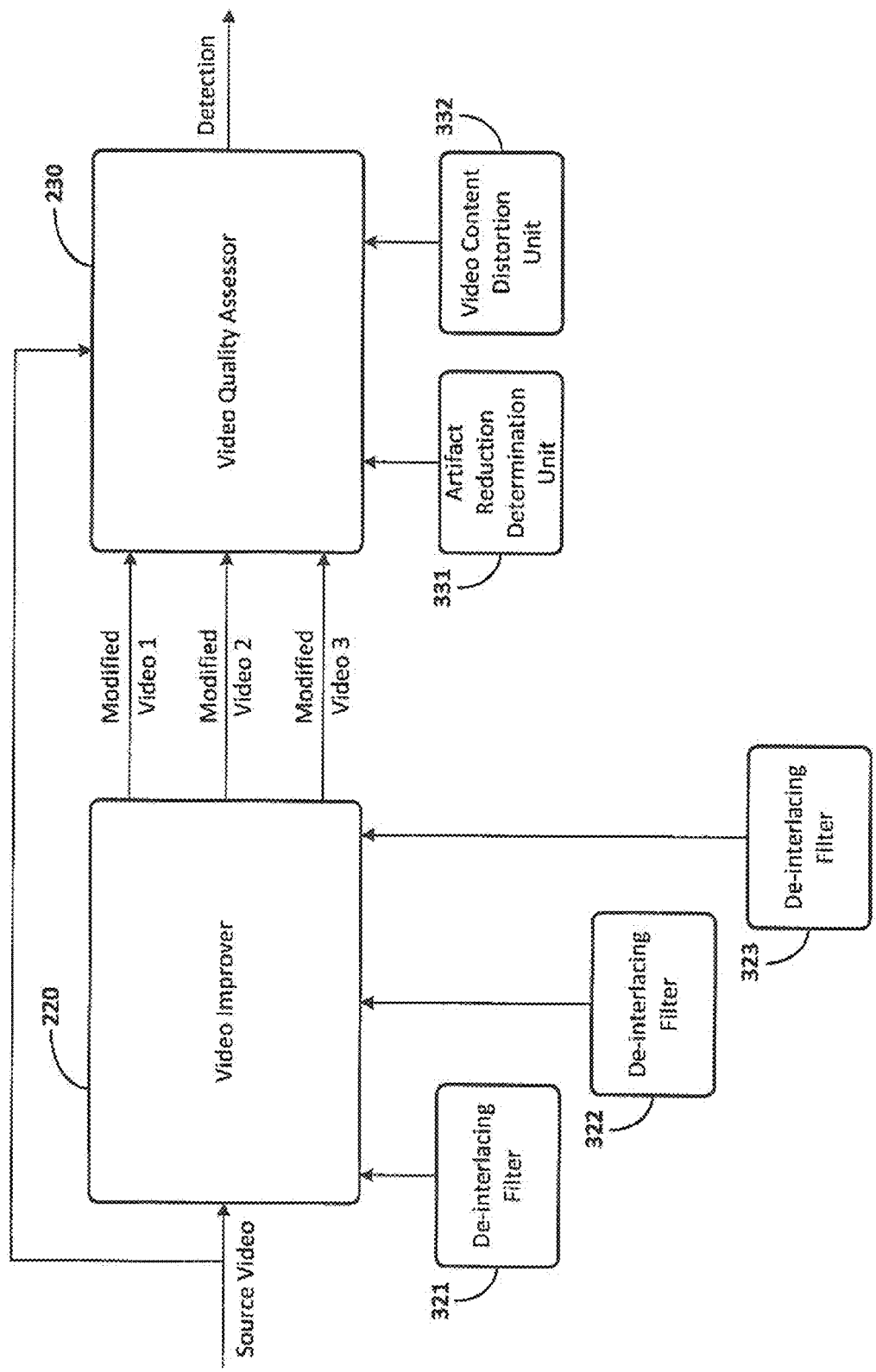
FIG. 3 illustrates an example of a video improver and a video quality assessor according to FIG. 2.

FIG. 3 is an example implementation of the video improver 220 and the video quality assessor 230 of system 200. The implementation depicted in FIG. 3 is directed to detecting if video raw data received by the video receiver 230 contains phenomena caused by interlacing.

As shown in FIG. 3, video raw data is received by the video improver 220. The video improver 220 may apply various de-interlacing filters, such as de-interlacing filter 321, de-interlacing filter 322, and de-interlacing filter 323. Each of the enumerated de-interlacing filters may be configured based on a different algorithm or technique implemented for removing artifacts caused by interlacing.

The video quality assessor 230 includes an artifact reduction determination unit 331 and a video content distortion unit 332. The video quality assessor 230 in FIG. 3 is configured to determine if phenomena caused by interlacing is removed. The artifact reduction determination unit 331 determines if a modified video has fewer artifacts caused by interlacing than a source video. The video content distortion unit 332 determines if a modified video is distorted less than a source video.

For each of the three modified videos created by the video improver 220 (one for each of the de-interlacing filters, respectively), the video quality assessor 230 determines if the modified video has fewer artifacts (via the artifact reduction determination unit 331) or lesser distortion (via the video content distortion unit 332) than the video raw data received by the video receiver 210. If any of the determinations by either the artifact reduction determination unit 331 of the video content distortion unit 332 indicates that the modified video has either fewer artifacts or less distortion, the video quality assessor 230 indicates that the video raw data has phenomena caused by interlacing. This indication may be transmitted to the video sharing web site 240, which may then subsequently flag the video associated with the video raw data for further processing to remove the phenomena caused by interlacing.

Figure 4:
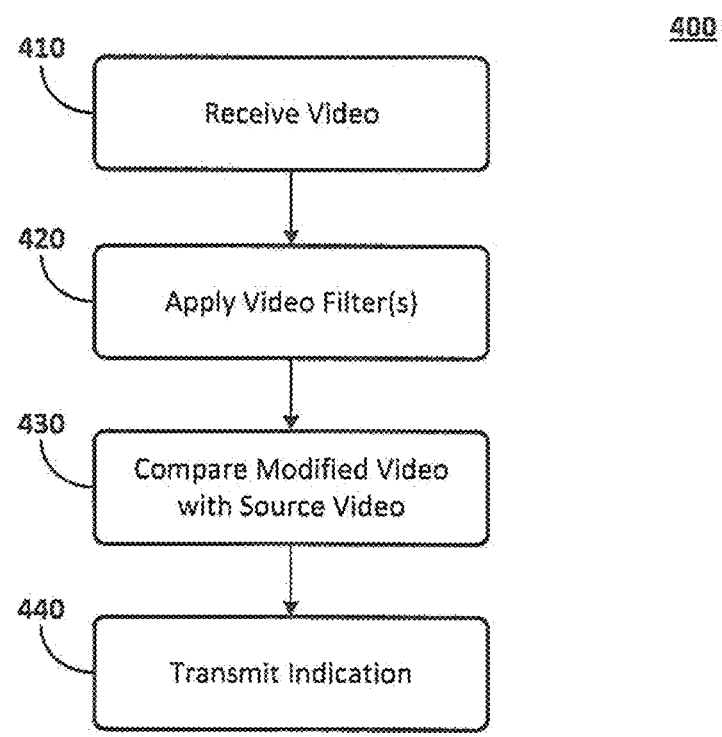
FIG. 4 illustrates an example of a method for detecting media source quality.

FIG. 4 illustrates an example of a method 400 for detecting media source quality. The method 400 may be implemented on the system 200 described above.

In operation 410, a video is received to perform the detection of method 400. The video may be sourced from a user of a video sharing web site 240. Thus, the video may be sourced from a variety of devices. The video sharing web site 240 may transcode the video into a unifying data format.

In operation 420, the video from operation 410 undergoes various filters implemented to remove or lessen phenomena that may affect the video's quality. Various filters may be implemented, such as the de-interlacing filters described above. Further, filters may be implemented to remove video blocking.

In operation 430, for each of the filters applied in operation 420, a determination is made as to whether the modified videos in operation 420 are of a greater quality than the source video received in operation 410. In performing the determination of operation 430, the modified video may be assessed based on the modified video containing fewer artifacts caused by interlacing, or having less distortion, for example.

In operation 440, based on the determination performed in operation 430, an indication is transmitted denoting whether the source video contains phenomena detected by method 400. This indication is made based on whether any of the filters performed in operation 420 positively affect the source video (as determined in operation 430).

Figure 5:
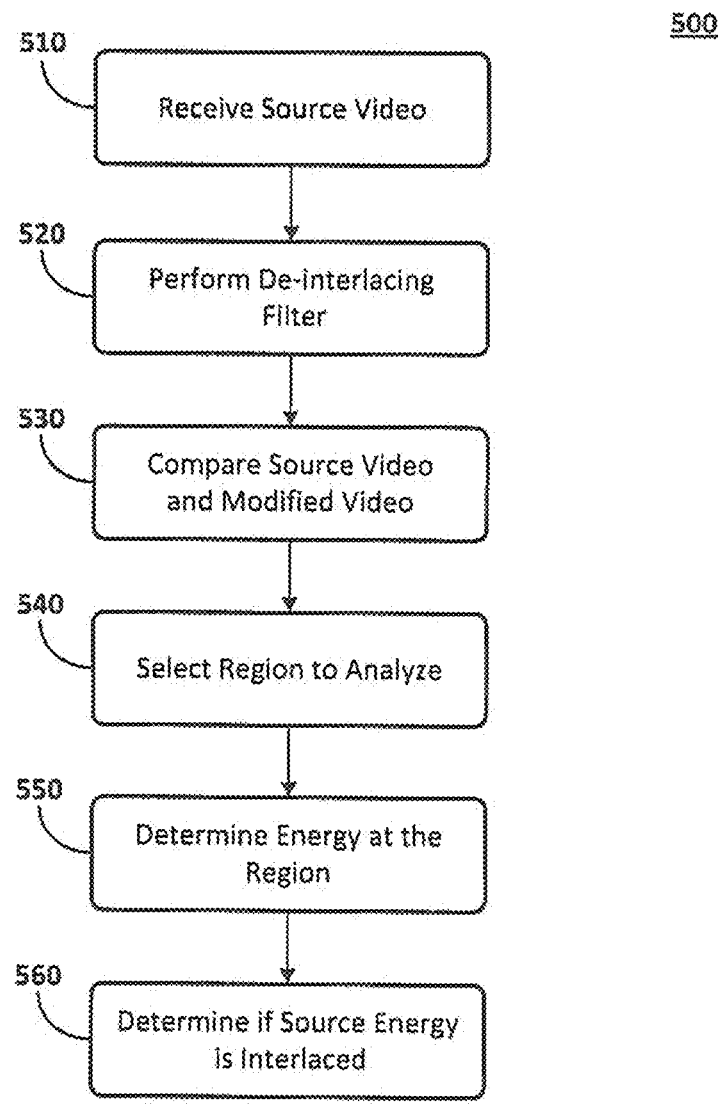
FIG. 5 illustrates an example method for detecting if a video is affected by interlacing.
Figure 6A:
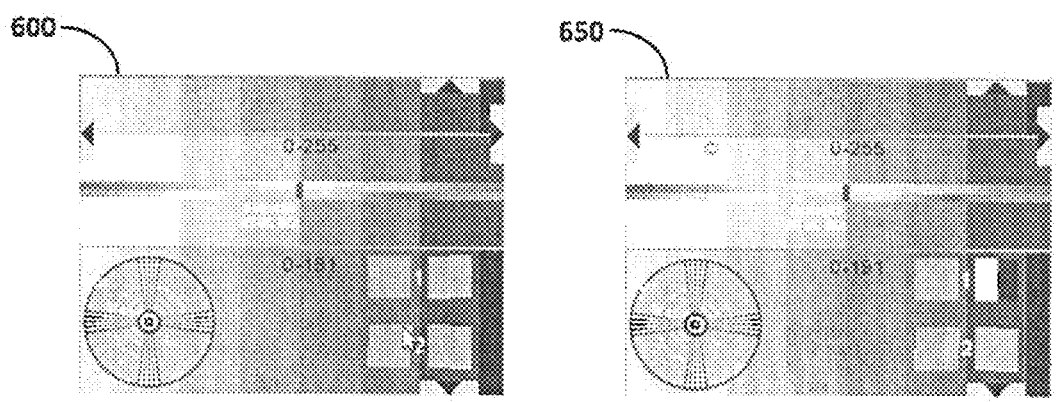
FIGS. 6(a) and 6(b) illustrate an example implementation of the method according to FIG. 5.

FIG. 5 illustrates an example of a method 500 for detecting if a video is affected by interlacing. The method 500 may be incorporated in the video quality assessor 230 of system 200. FIGS. 6(a) and 8(b) illustrate an example of the method 500 being employed.

In operation 510, a source video is received. Similarly to operation 410, the source video may come from any of a variety of source devices. Thus, the source video may be transcoded to a unifying format, and be represented via raw data.

In operation 520, the source video is modified via a de-interlacing filter. Various de-interlacing filters may be employed for operation 520.

In operation 530, the source video and the modified video are compared. Both source video and the modified video are transformed into new images, such as through a discrete cosine transform (DCT).

Figure 6B:
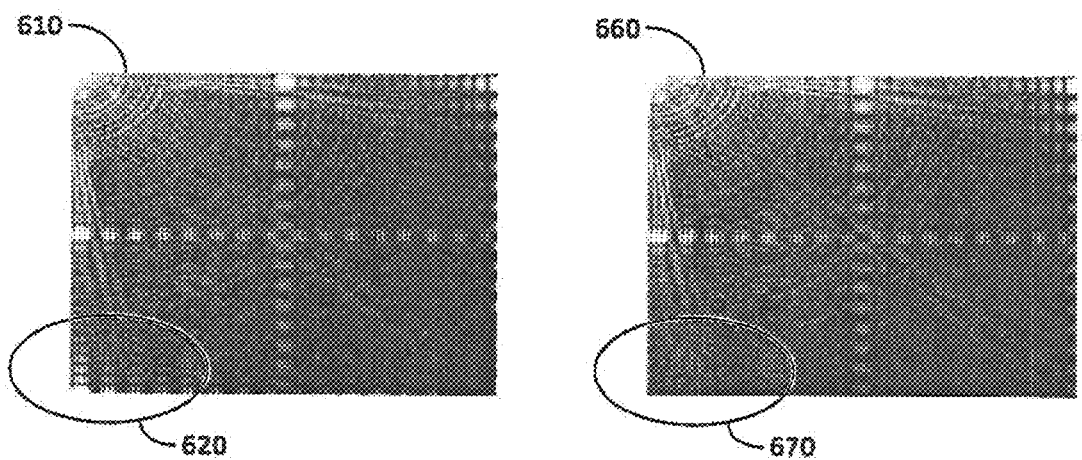

FIG. 6(a) shows a source video 600 and a modified image 650. FIG. 6(b) shows the DCT of the source video 600—source DCT image 610; and the DCT of the modified image 650—modified DCT image 660.

In operation 540, a region of the DCT images is selected to analyze. The region may be selected empirically, based on an operator's observation of the region most likely to be affected by interlacing. Alternatively, an implementer of method 500 may employ machine-learning to determine a region of the DCT images to analyze.

In operation 550, an energy associated with the selected region is determined. The energy pertains to the region's high vertical frequency domain. As shown in FIG. 6(b), the selected regions 620 and 670 illustrate the difference between an interlaced image (source image 600) and a de-interlaced image (modified image 650). The de-interlaced image contains very few high frequency components (as denoted by the solid blackness of the region 670).

In operation 560, a determination is made as to whether the source image 600 contains interlacing artifacts. This determination is performed by comparing the energy in regions 620 and 670. As shown in FIG. 6(b), the vertical frequency domains differ, with the de-interlaced image (modified image 650) having fewer high frequency components. Thus, in the case shown in FIGS. 6(a) and 6(b), a determination may be made that the source image 600 is interlaced. Conversely, if the modified DOT image 660 showed similar frequency indications as the source DCT image 610, a determination would be made that there is no or minimal interlacing affecting the source image 600.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 4 and 5. The disclosed devices, components, and systems contemplate using or implementing any suitable technique for performing the steps illustrated in these figures. Thus, FIGS. 4 and 5 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction can be received from the client device at the server.

We claim:

1. A system for detecting media source quality, comprising:
    a data store comprising a computer readable medium storing a program of instructions for the detection of media source quality;
    a processor that executes the program of instructions;
    a video data receiver to receive video raw data, the video raw data corresponding to an uploaded and transcoded video;
    a video improver to apply a video improvement technique to the received video raw data to produce a modified version of the video raw data; and
    a video quality assessor to compare the received video raw data and the modified version of the video raw data, and based on the modified version of the video raw data improving on a factor associated with the video improvement technique, the video quality assessor indicates a phenomenon affecting the quality of the uploaded and transcoded video.

2. The system according to claim 1, wherein the video improver applies a second video improvement technique to the received video raw data to produce a second modified version of the video raw data.

3. The system according to claim 2, wherein the video quality assessor compares the received video raw data and the second modified version of the video raw data, and
    based on either the modified version of the video raw data or the second modified version of the video raw data improving on a factor associated with either the video improvement technique or the second video improvement technique, the video quality assessor indicates the phenomenon affecting the quality of the uploaded and transcoded video.

4. The system according to claim 1, wherein the phenomenon is interlacing.

5. The system according to claim 4, wherein the video improvement technique is an artifact reduction.

6. The system according to claim 4, wherein the video improvement technique is video distortion reduction.

7. The system according to claim 1, wherein the phenomenon is video blocking.

8. A method for detecting media source quality, comprising:
    receiving video raw data, the video raw data corresponding to an uploaded and transcoded video;
    applying a video improvement technique to the received video raw data to produce a modified version of the video raw data;
    comparing, via a processor, the received video raw data and the modified version of the video raw data;
    based on the modified version of the video raw data improving on a factor associated with the video improvement technique, indicating a phenomenon affecting the quality of the uploaded and transcoded video.

9. The method according to claim 8, wherein the video improver applies a second video improvement technique to the received video raw data to produce a second modified version of the video raw data.

10. The system according to claim 9, wherein the video quality assessor compares the received video raw data and the second modified version of the video raw data, and based on either the modified version of the video raw data or the second modified version of the video raw data improving on a factor associated with either the video improvement technique or the second video improvement technique, indicating the phenomena affecting the quality of the uploaded and transcoded video.

11. The method according to claim 8, wherein the phenomena is interlacing.

12. The method according to claim 11, wherein the video improvement technique is an artifact reduction.

13. The method according to claim 12, wherein the video improvement technique is video distortion reduction.

14. The method according to claim 8, wherein the phenomena is video blocking.

15. A method for detecting interlacing, comprising:
    receiving video raw data, the video raw data corresponding to an uploaded and transcoded video;
    performing a deinterlace filtering on the received video raw data to produce a modified version of the video raw data;
    comparing, via a processor, the received video raw data and the de-interlaced filtered data; and
    based on an energy associated with the de-interlaced filtered data; being different than an energy associated with the received video raw data, determining that the uploaded and transcoded video contain interlacing.

16. The method according to claim 15, further comprising a transformation of the received video raw data and the modified version of the video raw data.

17. The method according to claim 16, wherein the transformation is a discrete cosine transform.

18. The method according to claim 17, wherein the energy associated with the received video raw data and the modified version of the video raw data is based on the discrete cosine transformations.

\* \* \* \* \*